March 29, 1938. M. L. RATHBUN 2,112,658
CLOSED RECEPTACLE OR CASE
Filed April 3, 1936
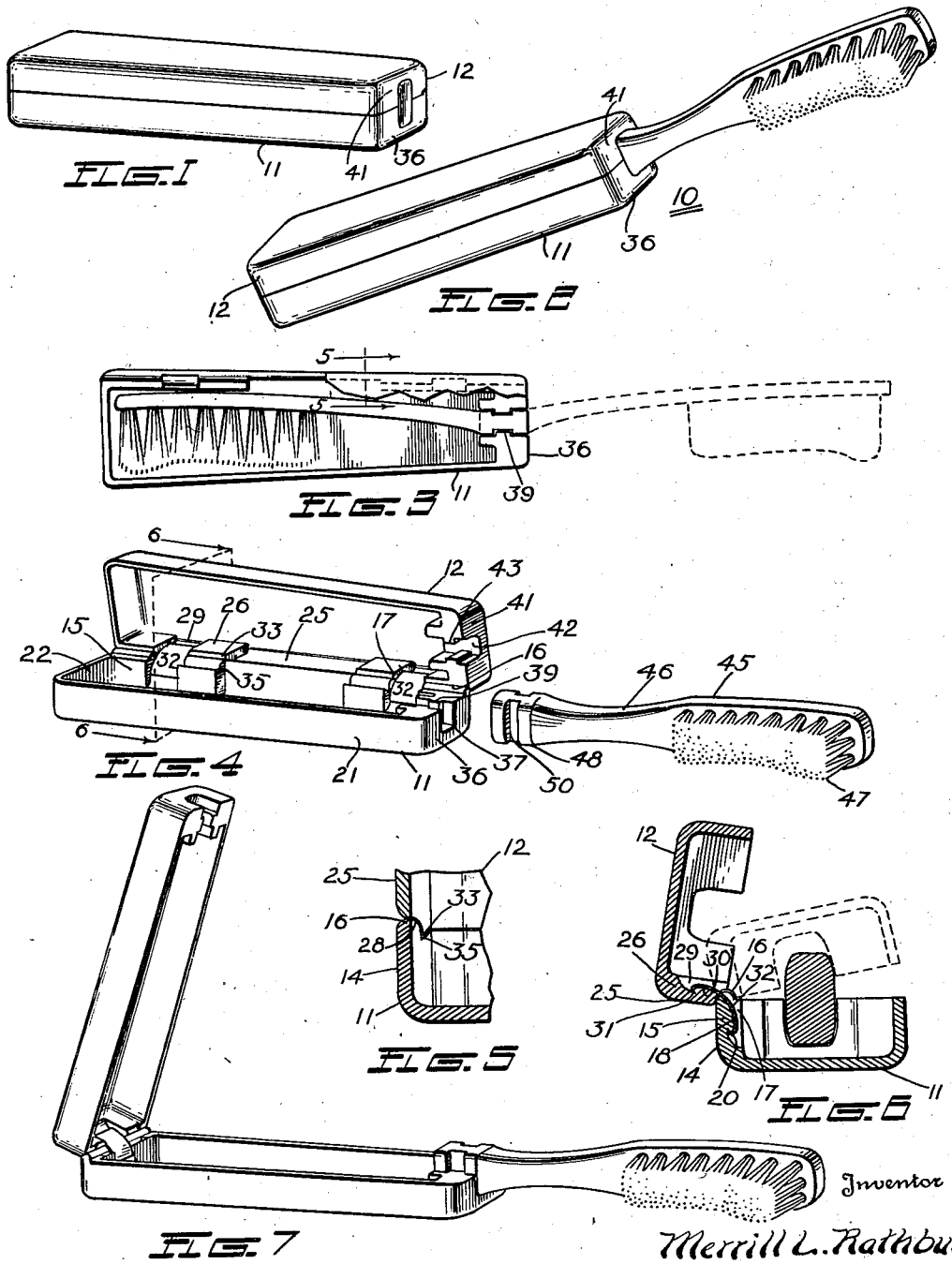
Inventor
Merrill L. Rathbun
By Richmond S. Hayes
His Attorney Patented Mar. 29, 1938

2,112,658

UNITED STATES PATENT OFFICE 2,112,658

CLOSED RECEPTACLE OR CASE

Merrill L. Rathbun, Jamestown, N. Y.

Application April 3, 1936, Serial No. 72,627

6 Claims. (Cl. 206—15.1)

This invention relates to an improvement in closed receptacles or cases and more particularly to articles supporting receptacles.

One form of the invention comprises a closed receptacle having means for supporting and securing an article in position of use or storage with relation thereto. Means may be provided for yieldingly retaining the cover in closed position on the body of a receptacle. Formed in either or both the body and cover is a suitable socket for receiving a part of the supporting shank of an article such, for example, as a brush. The shank of the article is adapted to be engaged with the socket in the receptacle when the article is in position of use or stored within the receptacle. It may be found as the present embodiment discloses, preferable to so design the receptacle that it will constitute a handle for the article when it is in position of use. In the present disclosure it is preferable to correlate the shape of the receptacle to that of the article so that the article may be readily stored and the receptacle may be of desired proportions. By securing the article in stored position within the receptacle, damage or breakage to the receptacle is prevented.

The material from which the receptacle and article is made has no bearing on the present invention inasmuch as all moldable substances such, for example, as rubber, bakelite, and synthetic resins, as well as wood or metal, may be used and are contemplated for use as may be found desirable in carrying out the invention.

One object of the invention lies in the provision of a closed receptacle for mounting an article of use.

Another object of the invention lies in the provision of a closed receptacle which is adapted to mount or support an article in stored position within the receptacle or position of use exteriorly thereof.

Another object of the invention lies in the provision of a receptacle having a pivotally connected body portion and cover adapted to mount and secure and supporting portion of an article.

Another object of the invention lies in the provision of a receptacle having a pivotally connected body portion and cover including means for yieldingly closing the cover on the body portion to mount and secure the supporting portion of an article in position of use or storage with respect to the receptacle.

Another object of the invention lies in the provision of a receptacle adapted to mount and secure an article in position of use, the receptacle being shaped to constitute a handle for the article.

Another object of the invention lies in the provision of a receptacle for mounting and securing an article in position of storage, the shape of the receptacle and the article being correlated.

Other and further objects and advantages of the invention will be more fully understood from a consideration of the following specification taken in conjunction with the accompanying drawing in which;

Fig. 1 is a perspective view of one embodiment of a receptacle with an article secured therein;

Fig. 2 is a further perspective view of one embodiment of the invention showing an article mounted in position of use with respect to a receptacle;

Fig. 3 is a plan view of the body of the receptacle, the cover being broken away, showing an article mounted and secured in stored position in the receptacle, dotted lines showing the position of use of the article;

Fig. 4 is a perspective view of the receptacle in open position and an article adjacent thereto ready to be secured to the receptacle;

Fig. 5 is a fragmentary transverse vertical sectional view showing the pivotal connection between the body portion and cover of the receptacle, being taken substantially on the line 5—5 of Fig. 3;

Fig. 6 is a transverse sectional view of the receptacle with the cover in open position showing the pivotal connection between body portion and cover and spring means for securing these elements in operable relationship, being taken substantially on the line 6—6 of Fig. 4; and Fig. 7 is a perspective view of a modified receptacle adapted to mount and secure an article.

Reference is had to the drawing wherein one modification of the invention is shown to comprise a receptacle and brush generally indicated by the reference numeral 10. The receptacle comprises a body portion 11 and cover 12. The body portion 11 is formed with one side wall 14 having one or more reinforced portions 15, depending on the size and utility of the receptacle. Along the upper edge of the reinforced portion 15 is a rolled portion or bead 16. This bead may be interrupted one or more places in its length by a recess or slot 17 which continues downwardly of the reinforced portion 15. The base wall 18 of the recess 17 may be formed in a predetermined curve which terminates in a spring seat 20. The curved portion of the wall 18 serves as a stop to limit opening of the cover to a desired degree by contact thereof with a strap spring which forms part of the structure. The other side and end walls 21 and 22 of the body portion 11 may be of any desired shape, these being optionally formed with or without projecting edges or recesses with which to engage a cover 12 for the purpose of overlapping or interfitting when the cover is closed down upon the body portion.

The corresponding side wall 25 of the cover 12 is formed with one or more reinforced portions 26, these portions corresponding in number and location with the reinforced portions 15 of the body 11. The portion 26 terminates along its lower edge in a recess or seat 28 which receives and is complemental to the bead 16 of the body 11. The reinforced portion 26 may also be interrupted by a recess 29 which corresponds in position to the recess 17 and has a curved base wall 30 terminating in a spring seat 31.

One or more strap springs 32 are provided for the purpose of securing the complementary pivotal portions of the body portion and cover in pivotal relationship. The pivotal portions and the spring seats in the body portion and cover are so located and designed that spring 32 normally urges the cover into either open or closed position. This is due to the fact that the only so called dead center position is with the cover in half open position.

Adjacent the aligned recesses 17 and 29 of the walls of the body portion and cover there may be provided as considered necessary, complementary engageable portions such as, for example, lugs 33 and recesses 35. The number of lugs, contour thereof, and corresponding number and contour of recesses, is largely dependent on the type, size and material from which the receptacle is made. When the cover is closed upon the body portion, the lug of one element of the receptacle projects into the recess of the other element and prevents twisting or misalignment of the cover with respect to the body portion.

The end wall of the body portion 36 is preferably reinforced and in the present disclosure is shown provided with a recess 37 connecting the exterior with the interior of the body portion. Mid-way of the side walls of the recess 37 are outwardly projecting ribs 39. The corresponding end wall 41 of the cover 12 is also reinforced and is formed with a recess 42 connecting the interior with the exterior of the cover. The side walls of this recess are also ribbed as at 43. When the cover is closed upon the body portion recesses 37 and 42 together form a passageway and ribs 39 and 43 constitute continuous projections into this passageway. The entire structure of this end of the body portion and cover may be considered a socket which is adapted to receive the mounting end of an article such, for example as a brush 45.

In the present disclosure a tooth brush is shown although it is evident that applicant is not limited to the kind of brush, or in fact to any specific article which may be mounted on or contained within a closed receptacle as herein shown and described. The shank 46 of the brush, as shown in the drawing is on edge and consequently, the bristles 47 are projected laterally. The mounting end 48 of the shank 46 is somewhat enlarged and is formed with two oppositely opening recesses or slots 50. The end of the shank 48 is of a size to fit snugly in the passageway formed jointly by the recesses 37 and 42 of the body portion and cover. The slots 50 of the end 48 receive ribs 39 and 43 and by reason of this interfitting of the end of the shank with the body portion and cover of the receptacle the brush 45 is prevented displacement.

It is to be understood that the socket, formed jointly in the body portion and cover of the receptacle, may be of a different shape, more suitable to securing other articles and also that it may be formed in either the body portion and cover, in this instance, the other element of the receptacle simply constituting a closure for the socket to prevent displacement of the shank of the article. It will be noted upon a comparison of the Figures 3 and 4 that the article 45 may be engaged with the receptacle to project outwardly therefrom for use or may be reversed end for end and stored within the receptacle. In the present disclosure it is found desirable to form the receptacle with slightly converging side walls which makes it conform generally to the shape of the brush and also enables using it as a handle.

The modification in Fig. 7 shows a receptacle, the cover and body portion of which are pivotally connected at the end opposite the reinforced end which receives and mounts the supporting end of an article. It is contemplated that in some instances the bulk or peculiar shape of the article may make it more desirable to have an end opening receptacle rather than one of the side opening type. It will be noted however that the method of supporting the article in the receptacle and the pivotal construction of the body portion and cover of the receptacle is substantially identical in both modifications of the drawing.

Although applicant has shown and described a receptacle adapted to mount a brush in position of use or storage and has also shown and described one type of pivotal connection between the body portion and cover of the receptacle, it will be understood that applicant contemplates modifications of the pivotal structure of the receptacle, its size and shape, type of socket, and the kind of article to be mounted in so far as these changes or modifications lie within the spirit and scope of the invention as defined in the hereunto annexed claims.

Having thus set forth my invention what I claim as new and for which I desire protection by Letters Patent is:—

1. A receptacle comprising a body portion and cover having pivotal connection, an article adapted to be received in said receptacle, means forming a part of said article and said receptacle co-operable to mount and secure said article on said receptacle, and spring means for causing said means to junction.

2. A receptacle like handle comprising a body portion and cover, complementary pivotal means connecting said body portion and cover, an implement adapted to be placed on or within said receptacle, a projection on said article, a socket in one wall of said body portion for receiving and interengaging said projection, said socket being closable by said cover, to prevent disengagement of said projection therewith, and spring means securing said pivotal means in operable relationship, said spring means also holding said body portion and said cover in handle position.

3. A receptacle like handle comprising a body portion and cover, complementary pivotal portions on the body and cover, spring means securing said body and cover in operable pivotal relationship, an implement adapted to be placed on said handle, a mounting portion on said implement, a socket in one wall of said body portion, interfitting parts on said mounting portion and said socket, said socket being closable by said cover, to maintain said parts in interengagement, said spring means holding said cover in closed position.

4. A receptacle like handle comprising body and cover elements, complementary pivotal portions on said elements, an implement adapted to be placed on and secured to said receptacle, a mounting portion on said implement, means in said elements and said portion cooperating to secure said implement in position of use, when the cover element is closed upon the body element, and spring means for maintaining the cover element in closed position upon the body element, said spring means also serving to secure the elements in operable pivotal relationship.

5. A receptacle like handle comprising body and cover elements, complementary pivotal portions on said elements, an implement adapted to be placed on and secured to said receptacle, a mounting portion on said implement, sockets in said elements opening toward each other, said sockets being ribbed to interengage corresponding recesses in said implement mounting portion and together forming a closed socket by which to prevent disengagement therefrom of said mounting portion, and spring means securing said elements in operable pivotal relationship and yieldingly maintaining the elements in closed or handle position.

6. A receptacle like handle comprising body and cover elements, an implement adapted to be placed on or within said receptacle, a projection on said implement, a socket in one of said elements for receiving said projection, said socket being closed by the other of said elements, to secure said projection against displacement and cause said elements to assume a handle like relationship.

MERRILL L. RATHBUN.